United States Patent [19]

Segal et al.

[11] 4,137,806
[45] Feb. 6, 1979

[54] SILENCING MEANS FOR ROTARY CUTTING TOOLS PARTICULARLY CIRCULAR SAWS

[75] Inventors: Arthur R. Segal, Jasper, Ind.; Jack E. Robertson, Huntsville, Ala.

[73] Assignee: North American Products Corp., Atlanta, Ga.

[21] Appl. No.: 791,175

[22] Filed: Apr. 27, 1977

[51] Int. Cl.² .................. B27G 19/02; B23Q 11/06
[52] U.S. Cl. .................. 83/478; 144/251 R; 181/205
[58] Field of Search ............ 83/478, 546, 486.1, 83/860, 440.2; 181/200, 205, 293; 144/251 R

[56] References Cited

U.S. PATENT DOCUMENTS

| 2,781,067 | 2/1957 | Kaley | 144/25 R |
| 2,926,709 | 3/1960 | Kaley | 83/478 |
| 3,688,866 | 9/1972 | Kong | 181/205 |
| 3,913,437 | 10/1975 | Speer | 83/478 |
| 4,043,444 | 8/1977 | Bobeczko | 181/200 |

Primary Examiner—Donald R. Schran
Attorney, Agent, or Firm—James R. Custin

[57] ABSTRACT

Noise output of a rotary cutting tool such as a circular saw blade is substantially reduced by means of a guard which wholly encloses the blade when the blade is not cutting and which comprises fixed and movable imperforate guard members, the movable guard member being movable to expose only the cutting segment of the blade. Inner surfaces of the flat side walls of the guard have sound absorbing means such as a Helmholtz resonator array or a layer of acoustical foam. Modifications of the guard to optimize its silencing effectiveness are disclosed.

19 Claims, 8 Drawing Figures

Fig. 1

SILENCING MEANS FOR ROTARY CUTTING TOOLS PARTICULARLY CIRCULAR SAWS

This invention relates to means for silencing rotary cutting tools such as circular saws, and is more specifically concerned with structure that provides both a guard and a silencer for such a cutting tool.

Rotating cutting tools of the type that have toothed peripheries tend to be noisy in operation, but of all such tools a circular saw, even when it is not cutting, is undoubtedly the noisiest. Tests have shown that the noise output of an unsilenced circular saw of about 14 to 18 inch diameter, rotating at 2,000 to 4,000 rpm (a normal operating speed), but not cutting, is on the order of 90 to 95 dB. This noise level is recognized as uncomfortable and possibly detrimental to health, especially in view of the fact that the major portion of it is in that part of the sound frequency spectrum to which the human ear is most sensitive, namely, between about 2000 and 4000 Hz. Furthermore, a significant proportion of saw noise is at frequencies which the ear recognizes as high-pitched and is therefore annoying even at low amplitude levels.

For some time now, legislation has been in effect that has made noise abatement mandatory. In response to that legislation, ways and means have been found for quieting many other kinds of machinery, but until the advent of the present invention there seemed to be no real hope of bringing circular saws into compliance. Therefore, many shops and factories that rely upon circular saws may have been operating in violation of the law, because the only available alternative was to stop using such saws and thus halt production.

For a long time before that legislation was enacted, there had been insistent demands by union officials, legislators, individual employees and by many employers, too, for general improvement of working conditions in production plants. The problem of circular saw noise, where it existed, certainly had a bearing on working conditions. If there had been any solution to that problem that was obvious to those skilled in the art, it could not have failed to come forward.

Heretofore, however, the only available practical remedy has been to provide ear plugs for those who were required to work near a circular saw. This expedient did not really solve the problem, but those concerned apparently regarded saw noise as inevitable and reconciled themselves to minimizing perception of it rather than minimizing generation of it.

One of the few attempts to attack the problem of circular saw noise at its source is reflected in U.S. Pat. No. 2,583,239 to Sutton, issued in 1952. Sutton disclosed the mounting of a felt pad in close, flatwise parallel proximity to one face of the circular saw blade of a table saw. The pad was mounted beneath the table and was a relatively small one, extending radially across the teeth of the saw along a sector which was, at most, about 15% of the tooth orbit. From what has been learned about saw noise through work in connection with the present invention, it can be said with some confidence that the silencing means disclosed by Sutton could have been no more than minimally effective.

Other attempts to solve the problem have proceeded from consideration of the process by which a circular saw blade generates noise. It has been recognized, of course, that the basic cause of saw blade noise is air turbulence produced by the teeth of the blade, due to the high peripheral speed of the blade relative to the surrounding air. Such turbulence could be eliminated or minimized by streamlining the teeth, but, needless to say, streamlined teeth would be so completely incompatible with the cutting function of the saw as to be out of the question. Efforts to achieve a compromise tooth form that would achieve both reduced noise output and satisfactory cutting efficiency have not been successful.

Other and somewhat more sophisticated approaches are reflected in recently issued British Pat. No. 1,452,238. It discusses certain prior attempts to reduce saw noise by providing a "dead" saw blade body that would prevent transfer of vibrations from the teeth to the remainder of the body, and it points out that blades constructed to embody this principle were functionally unsatisfactory. The British patent proposes, instead, to reduce the thickness of the blade at the roots of the teeth, to enable the teeth to vibrate independently of the remainder of the blade body. A saw blade made in accordance with the teachings of this British patent may be relatively quiet, but it is not likely to be notable for long life or cutting accuracy. At any rate, such saw blades have not gone into substantial commercial use, and it is understandable that saw blade users would hesitate to take the risk of experimenting with them.

It is thus a general object of the present invention to provide a solution to the problem of circular saw noise which neither skill nor ingenuity has heretofore been able to solve, and, moreover, to provide a solution which attacks that problem at its source but does not involve compromise with the safety, durability or cutting efficiency of the saw blade.

More specifically, it is an object of this invention to provide silencing means for very substantially minimizing the output of noise from a circular saw blade or other rotary cutting tool having circumferentially spaced cutting teeth on its periphery, which silencing means requires no modification of the cutting tool itself and in no wise interferes with the operation of the cutting tool or with its use in a normal manner.

It is also a specific object of this invention to provide a device for silencing a cutting tool of the character described, whereby noise output from the cutting tool is very substantially reduced both when the tool is cutting and when it is idling, and which device permits the tool to be operated and used in a manner that is in all respects normal and conventional but provides a very effective guard whereby an operator of a machine comprising the tool is prevented from coming into contact with cutting edges on the tool.

Thus it is another object of this invention to provide an effective guard for a rotary cutting tool of the character described, which guard also serves as a very effective silencer whereby the noise output of the tool is greatly reduced.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIG. 7 is a view generally similar to FIG. 6 but illustrating a further modified form of the invention.

Referring now more particularly to the accompanying drawings, the numeral 5 designates generally a rotary cutting tool having cutting teeth 6 at circumferentially spaced intervals around its periphery. The specific cutting tool here illustrated is a circular saw blade having a disc-like body 7, relatively deep gullets 8 between its teeth, and a hard block-like tip 9 secured to each tooth and providing a cutting edge. The present invention is applicable to other rotary cutting tools, but the circular saw blade that is here illustrated serves as an especially appropriate example because it generates more noise than almost any other cutting tool and, moreover, generates a noise that is particularly objectionable because of its high pitch.

Figure 1:
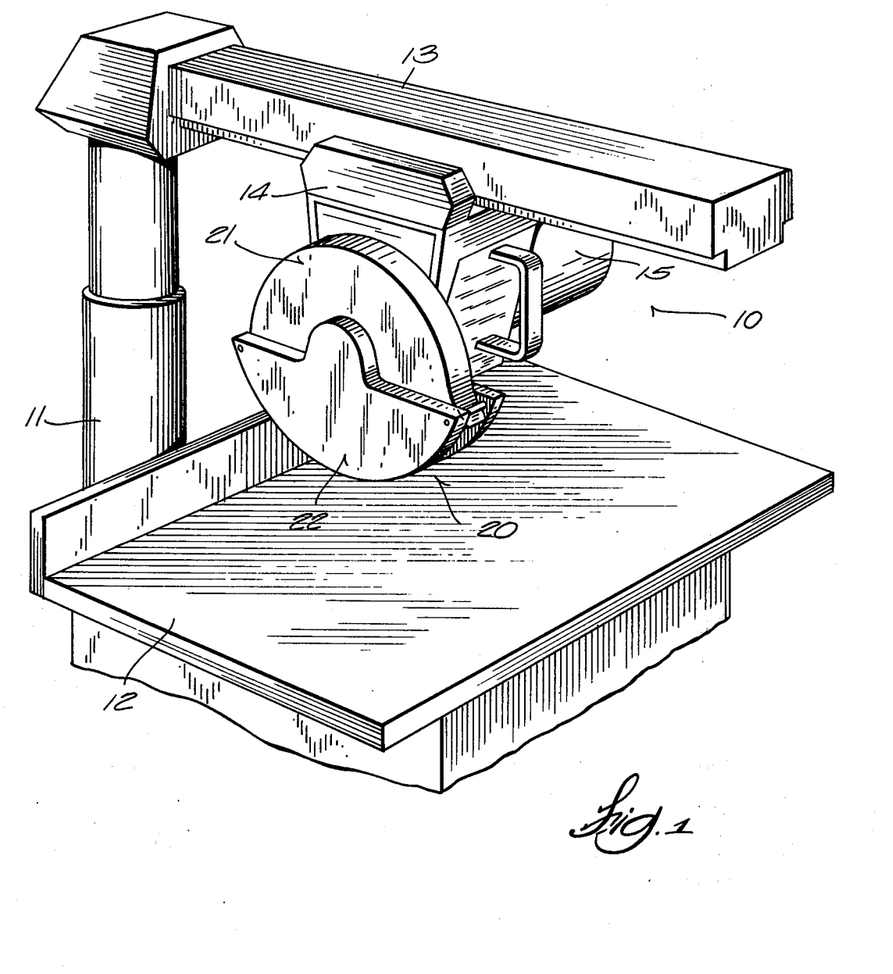
FIG. 1 is a fragmentary perspective view of a radial arm sawing machine equipped with a combined guard and silencer embodying the principles of this invention.

The saw blade 5 is illustrated in FIG. 1 as mounted on a radial arm sawing macine 10. That type of machine is selected for purposes of example because it presents the problem of saw noise in its most acute form. A radial arm machine has an upright mast 11 projecting up from one side of a horizontal table 12, and has an arm 13 that extends radially outwardly from the mast at a level above the table. The arm 13, which is swingable about the axis of the mast and is adjustable up and down on it, serves as a track or rail along which a sawing head or carriage 14 is lengthwise movable. The sawing head comprises an electric motor 15, and the circular saw blade 5 is mounted directly on the shaft of that motor to be driven by it. The sawing head can be locked against movement along the arm 13, and the portion of the head that comprises the motor 15 and saw blade 5 can be locked in various positions of swiveling rotation about coordinate axes that are parallel to the axis of the mast 11 and parallel to the length of the arm 13, respectively.

The radial arm sawing machine 10 is shown equipped with a combined guard and silencer 20 that embodies the principles of the present invention. The guard 20 comprises an upper relatively stationary member 21 and a lower member 22 which is carried by the upper member for up and down movement relative thereto. The upper member 21 is fixed to the carriage or sawing head 14. It can be mounted on the frame of the motor 15 if the saw blade 5 is mounted directly on the motor shaft, or it can be secured to a bracket or the like (not shown) that supports the motor. In any event, the upper guard member 21 encloses a major portion of the saw blade.

The lower guard member 22 is biased by its own weight to a normal or non-cutting position, illustrated in FIG. 1, in which it cooperates with the upper guard member 21 to enclose the saw blade 5 substantially completely. Upon relative horizontal movement between the sawing head and a workpiece (not shown), to engage the blade 5 with the workpiece, the lower guard member 22 is cammed upwardly by the workpiece so that it exposes the lower segment of the saw blade to allow the blade to make its cut. The lower guard member of course rides across the workpiece on the upper surface thereof, so that the blade is exposed only to the extent necessary for cutting; and as soon as the saw blade is clear of the workpiece the lower guard member returns to its normal, non-cutting position.

It will be apparent that the guard of this invention, considered solely as a guard, provides the utmost operator safety that can be obtained consistently with requirements for convenience. In addition, however, it greatly reduces the noise output of the saw, owing to its possession of certain characterizing features that are pointed out hereinafter.

Before turning to a more detailed description of the silencer-guard, the process of saw noise generation should be explained, to provide a better understanding of how the guard of this invention performs it silencing function.

The primal source of the noise produced by the saw blade 5 is of course air turbulence generated by its teeth 6 and cutting tips 9. For cutting efficiency, the teeth and tips must be so shaped that the generation of air turbulence is inevitable, and considering that the teeth on an 18 inch diameter blade rotating at 3600 rpm are moving at over 280 ft./sec. (over 180 mph), it can be expected that such turbulence will be severe. Due to accelerations around sharp corners on the teeth and cutting tips 9, even higher local air velocities will be attained within the vortices shed by peripheral portions of the blade. Hence a certain proportion of the sound emanating from a rotating circular saw blade is directly generated as air noise.

However, the disc-like body 7 of the saw blade is resilient, and the teeth are set into vibration in reaction to the very substantial forces that they exert upon the air in their production of turbulence. Such reaction-produced vibration is transmitted into the body of the blade, which acts as a sounding board or, in more technical terms, as an efficient dipole radiator. Thus a very substantial part of the energy expended in developing air turbulence is manifested as sound energy radiated from the body of the blade itself.

To some extent vibration of the blade body could probably be damped by means of such expedients as are disclosed in the above discussed British patent; but in a radial arm saw, isolation of tooth vibrations from the blade body cannot be completely successful. In such a machine the sawing head 14 is cantilevered on the elongated boom and mast structure that necessarily provides a somewhat resilient support for it, and therefore the whole cutting head is mounted in a manner that favors bodily vibratory motion in directions transverse to the plane of the blade, such as are induced by reaction of the blade to air turbulence. It should also be pointed out that the saw table 12 acts as a reflector which tends to disperse the noise in all upward directions, so that the operator's ears are at or near the zone of highest noise intensity.

From the foregoing explanation it will be apparent why prior guards for circular saw machines have not provided any noticeable degree of silencing. A grill-like guard, such as has been used in the past, offers no hindrance to propagation of blade noise. A substantially imperforate guard of resilient sheet metal, such as has been frequently used heretofore, does nothing to suppress noise because sound waves generated by the blade bounce back and forth between its inner surfaces until they escape substantially undiminished through openings in it; and if the walls of the guard can be set into vibration by the noise, those walls become secondary but rather effective radiators of it. Hence there has heretofore been no reason to believe that a guard for a circular saw blade has any potential for reducing blade noise.

According to the present invention, however, blade noise can be reduced to a remarkable extent by reason of the guard 20 having certain essential features which are now set forth.

It is important that the guard be made of a material such that its walls will not tend to vibrate at blade noise frequencies. High impact plastics are suitable for the purpose, not only because of their tendency to damp vibration but also because of the ease with which they can be worked and because of their relative lightness, which allows the guard to be made with fairly thick walls without its becoming unduly heavy. Other suitable vibration damping materials will be obvious.

The guard should enclose as much of the cutting tool as possible, and preferably it should enclose substantially all of the tool whenever the tool is not actually cutting.

The guard should have substantially imperforate walls. This does not mean that the walls of the guard cannot be porous, but there should not be apertures in the guard that are large enough to permit sound to leak out of its interior.

Finally, at least those portions of the interior surfaces of the guard that oppose the body of the cutting tool should comprise sound absorbing means. In the case of a guard for a circular saw blade, the sound absorbing means should oppose those portions of the blade disc surface that extend radially from near its shaft substantially to its tooth gullets 8.

Figure 2:
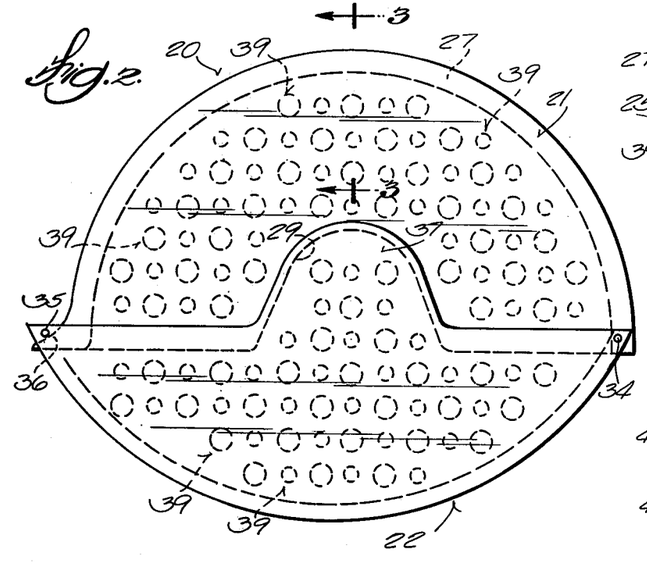
FIG. 2 is a view in side elevation, on an enlarged scale, of the cutting tool guard and silencer shown in FIG. 1.
Figure 3:
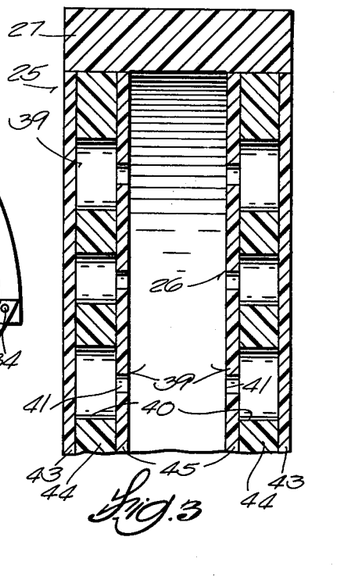
FIG. 3 is a view in cross section, taken on the plane of the line 3—3 in FIG. 2, but on an enlarged scale.

The blade guard 20 is illustrated as being made substantially entirely of high impact plastic. Its fixed upper guard member 21 comprises a pair of opposite substantially flat side wall portions 25, 26 that are more or less semicircular in outline and are disposed at axially opposite sides of the saw disc, substantially parallel to the plane of the disc. The side wall portions 25, 26 are bridgingly connected by an arcuate wall portion 27 which extends around their curved edges and which thus curves substantially concentrically about the cutting tool axis and is spaced a small distance radially outwardly from the tooth tips. The upper guard member encloses somewhat more than half of the blade, and therefore the substantially straight, horizontally extending lower edge of each of its side wall portions 25, 26 has a medial recess or cutout 29 to provide clearance for the cutting tool shaft. Screws 30 or similar fasteners can project through the wall portion 26 at the motor side of the saw disc, at a few locations spaced around the cutout 29, to provide for securement of the guard to relatively fixed structure on the saw machine. Preferably the screws 30 engage the wall portion 26 at locations relatively close to its cutout, and hence near the motor axis, so that the damping effect of the material of that wall portion is utilized to prevent axial vibrations of the motor from being transmitted into the remainder of the guard and then radiated by it as noise.

The lower guard member 22 comprises a pair of substantially segment-shaped plate-like wall portions 31 and 32 at opposite sides of the blade which slide edgewise up and down across the outer surfaces of the fixed wall portions 25, 26. The lower guard member is pivoted for up and down swinging motion by means of a hinge pin 34 extending through the two guard members near one end of the arcuate wall portion 27 of the upper guard member. The lowermost position to which the lower guard member can swing is defined by another pin 35, which extends through the two wall portions 31, 32 of the lower guard member near the opposite end of the arcuate wall portion 27, and which is engageable against an upwardly facing abutment 36 on the upper guard member. The pin 35 also constrains the two wall portions 31, 32 of the lower guard member to swing up and down in unison.

The wall portion 31 of the lower guard member that lies at the motor side of the guard has its straight upper edge interrupted, midway between the ends thereof, by a relatively deep downwardly extending arcuate slot 36 that accommodates the blade shaft 17 as the lower guard member swings upwardly. However, the opposite wall portion 32 of the lower guard member has an upwardly projecting bulge 37 in its upper edge, to provide, in effect, a cover for the cutout 29 in the fixed side wall member 25.

In the case of the combined guard and silencer illustrated in FIGS. 2 and 3, the sound absorbing means of the interior surface of the side wall portions 25, 26, 31, 32 comprises a plurality of Helmholtz resonators 39 that are formed in those wall portions and open to their interior surfaces. A Helmholtz resonator is a known device for absorbing sound in a narrow frequency band that centers on a fixed frequency at which the resonator is naturally resonant. A Helmholtz resonator has a cylindrical cavity 40 that is of predetermined depth and diameter and is closed at one end but opens at its other end through an axially shorter and smaller diameter aperture 41 that is concentric with the cavity.

The governing equations for Helmholtz resonator design are rather well known but are presented here for convenient reference:

$$f_r = \frac{C}{2\pi}\left[\frac{C_o}{V}\right]^{\frac{1}{2}}$$

where:
$f_r$ = resonant frequency,
$C$ = speed of sound in air,
$C_o$ = (A/m + n), aperture conductivity,
$V$ = cavity volume,
$A$ = aperture area,
$m$ = aperture neck length,
$n$ = aperture end connection $\approx 1.70_{r_o}$ (for a cavity cross-section large compared to orifice cross-section). Resonator quality factor, Q, is given by:

$$Q = \frac{f_r}{\Delta f},$$

where $\Delta f$ = 3dB down point bandwidth about $f_r$ for resonator resonance. For maximum sound absorption by a resonator:

$$Q = \left(\frac{V}{C_o^2}\right)^{\frac{1}{4}}$$

In the illustrated guard, each wall is formed of three laminations of material, flatwise bonded together, namely an outer imperforate lamination 43, a medial lamination 44 in which the cylindrical cavities 40 are formed, and an inner lamination 45 in which the cavity apertures 41 are formed. The medial lamination 44 is the thickest of the three, and all cavities are formed as holes drilled entirely through the medial lamination so that all cavities have the same axial depth. The cavity apertures 41 are likewise formed as holes that are drilled through the inner lamination 45.

In a guard of this invention that was made in accordance with the construction illustrated in FIGS. 2 and 3, the medial lamination 44 was ¼ in. thick, so that all cavities were of ¼ in. axial depth; but the cavities were of eleven different diameters, from 5/16 in. to 15/16 in., differing by 1/16 in. steps. The innermost lamination 45 was 1/16 in. thick and every cavity aperture 41 was ¼ in. in diameter. Resonator design frequencies were thus in the range of 1536 Hz to 4608 Hz. The number of resonators of each size was so chosen as to provide maximum absorption in the 2,000 to 3,000 Hz frequency range. Calculated Q for the resonators ranged from 17.33 to 22.81. The resonators of the array were so arranged that resonators of similar or near-similar resonant frequencies were not located adjacent to one another, in order to minimize interaction between such resonators whereby performance might be degraded.

Careful tests were made on this guard in a reverberant chamber, so as to measure total sound energy radiated to the surroundings. The guard was found to achieve a very substantial noise reduction on 14, 16 and 18 inch blades, with the maximum noise reduction (of about 10 to 11.4 dB) occurring in each case at approximately the peak of the bare-blade noise spectrum.

During initial tests, Helmholtz resonators had been located over substantially the entire interior surfaces of the guard side wall portions. It was found that the resonators in the vicinity of the blade tooth orbit were actually responsible for a certain amount of noise generation, apparently because they generated discrete resonant tones at certain frequencies, especially as the blade accelerated up through the range of speeds from about 1,000 to 3,000 rpm. Such noise generation probably resulted from excitation of those resonator cavities by vortices shed by the blade teeth. An improvement in silencing effectiveness was measured upon taping over the apertures of such of the resonators as were located radially outwardly of a zone just inside the tooth gullets.

Experiments were also made with forming resonator cavities in the arcuate wall portion 27 of the upper guard member. Such resonators were likewise found to generate a certain amount of self-noise, and it was concluded that in cases where Helmholtz resonators are employed as sound absorbing means, such resonators should be confined to those portions of the side walls of the guard that lie radially inwardly of the tooth gullets.

It was observed that the guard having Helmholtz resonators developed guard cavity resonances at certain frequencies, which resonances were particularly noticeable as the blade was accelerated from zero to operating speed. It was found that such noise could be reduced by locating the blade in slightly offset relation to a point midway between the opposite side walls of the guard. In connection with experiments relating to such blade offset, measurements were also taken with the side walls of the guard spaced apart by various distances between 1¼ inches and 3⅜ inches, in ⅛ inch increments. The most effective configuration for silencing was with the guard walls spaced apart by the minimum tested distance of 1¼ inches, and with the blade ¼ inch closer to one side wall than to the other. However, it should be pointed out that the improvement in silencing effectiveness that was obtained with the offset blade was not a very large one, although large enough to be significant in marginal cases. For the whole series of tests involving side wall spacing and blade offset, variations in measured sound level diminution ranged between +2dB and −1dB.

Another sound absorbing means that was used on the side wall portions of the guard, and found by tests to be effective, was fine-pore polyester urethane foam of ½ inch thickness. Typical materials of this type are foams with perforated polyurethane and perforated vinyl coatings, intended for acoustical surface treatment purposes.

Figures 4, 8:
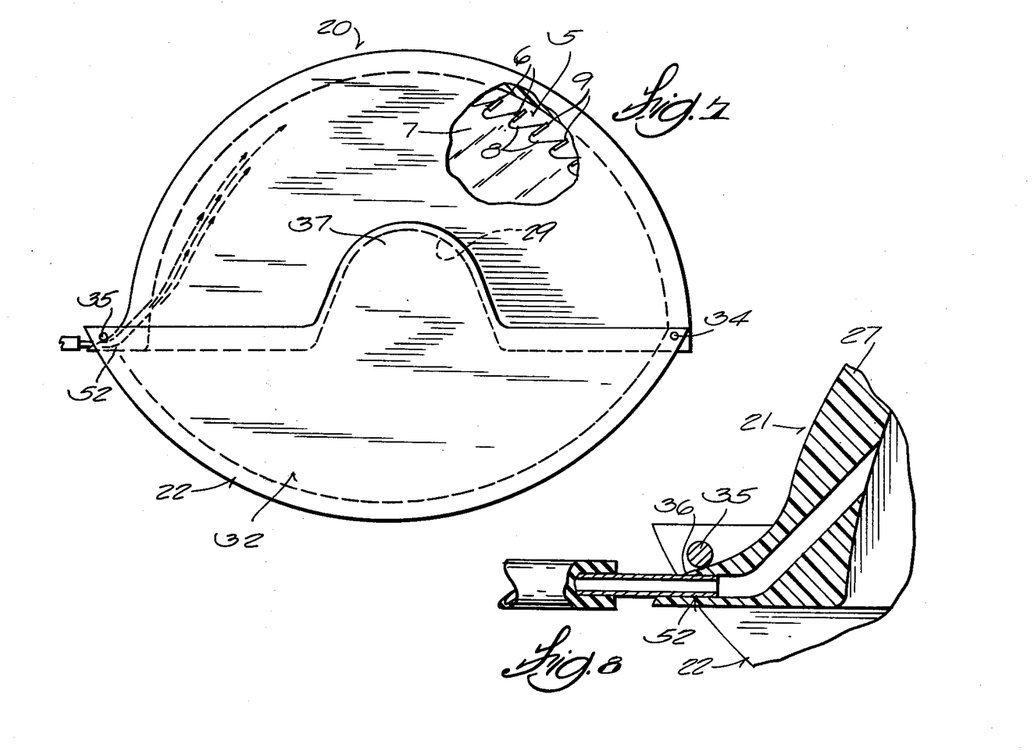
FIG. 4 is a view in side elevation, with portions shown broken away, illustrating a modified form of the guard of this invention.
FIG. 8 is a fragmentary longitudinal sectional view, on an enlarged scale, of a portion of the combined guard and silencer shown in FIG. 7, taken approximately on the plane of the saw blade.
Figure 4:
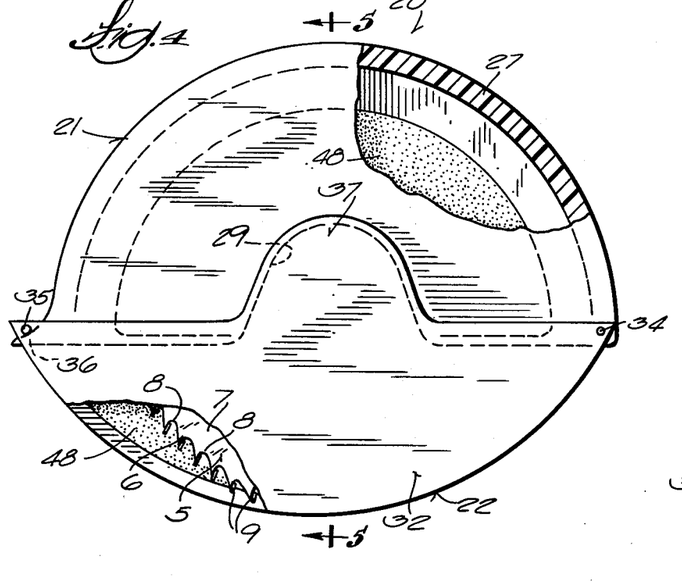
Figure 5:
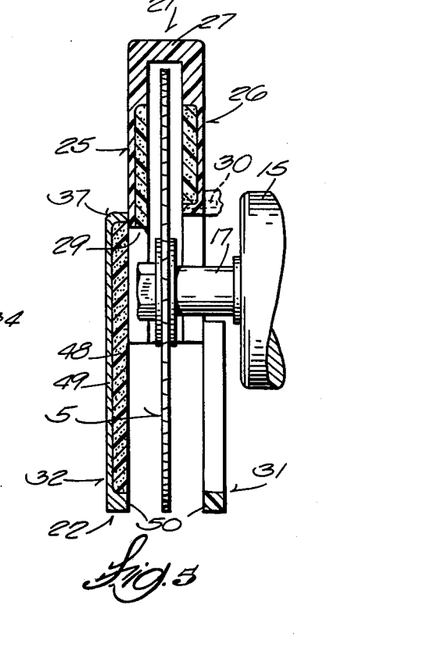
FIG. 5 is a view in cross section taken on the plane of the line 5—5 in FIG. 4.
Figure 6:
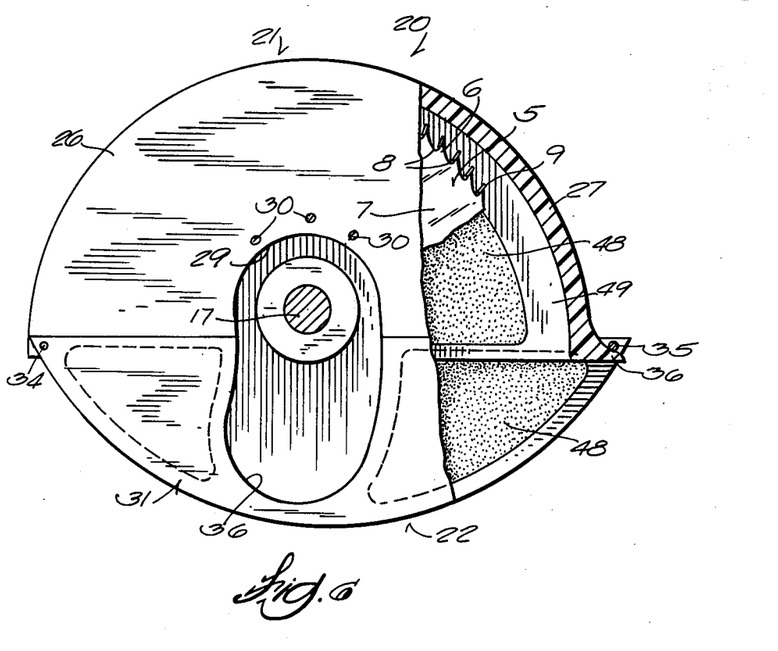
FIG. 6 is a view in side elevation of the combined guard and silencer shown in FIG. 4, but as seen from the opposite side thereof, that is, the side at which the motor is located.

For tests with the acoustical foam material, the several side wall portions, as shown in FIGS. 4–6, comprised a single sheet 49 of high impact plastic, to the inner surface of which a ½ inch thick layer 48 of acoustical foam was bonded. The foam material was cut somewhat smaller than the plastic sheet 49 that comprised the wall member proper, to leave a margin around the foam material. A frame-like member 50 of ½ inch thick high-impact plastic was bonded to the sheet 49 to protect the edges of the foam material and cooperate with it in providing a flat inner surface on the wall member.

Initially, tests were made with the acoustical foam treatment on only the lower movable guard member, while the upper guard member had Helmholtz resonators for sound absorption. It was found that an additional gain of 3 or 4 dB of noise reduction could be obtained with acoustical foam in the lower guard member, as compared with the effect of a lower guard member having Helmholtz resonator treatment. It was also found that acoustical foam treatment of the upper guard member was somewhat more effective from the standpoint of silencing than the Helmholtz resonator treatment.

The various acoustical foams that were tested did not differ greatly from one another with respect to overall noise suppression. Mainly they differed with respect to the specific frequency bands at which they were most effective, apparently due to differences in the protective coatings on the exposed surfaces of the several materials.

In selecting an acoustical foam, consideration must be given to the fact that the interior of the guard is subjected to a certain amount of abrasive action from sawdust or cuttings propelled through it by the rotating blade. It will be apparent that an acoustical foam with a protective coating will have a longer useful life, even though it has less sound absorbing effectiveness than an unprotected foam, and that Helmholtz resonator treatment is not as likely to present problems with respect to durability. The acoustical treatment need not be uniform through all portions of the silencer-guard, and therefore resonator treatment can be employed in portions of the guard that are subject to substantial abrasion, while foam can be used in other portions, the particular foam being selected with a view to both its sound absorbing effectiveness and the amount of abrasion that it will be required to sustain in the location selected for it. Such a compromise between silencing effectiveness and useful life may not result in absolutely optimum silencing, but it will not be much below optimum in any case, because the differences in sound absorbing effectiveness as between the different treatments tested is not great. It can be said that any sound absorbing medium that would be reasonably satisfactory from the standpoint of both durability and acoustical effectiveness would achieve a very worthwhile reduction in noise level as compared to a bare blade or one having a heretofore conventional guard.

It should be emphasized that the movable lower member 22 of the guard of this invention plays a very important role in noise reduction. Tests were run both with and without the lower guard member. For some such tests the lower guard member was removed; for others it was maintained in its highest position, in which its side wall portions substantially completely overlay the side wall portions of the upper guard member 21. In the latter case slightly better quieting was obtained than with the lower guard member removed, but in both cases noise output was substantially higher than with the lower guard member in its non-cutting position and providing a substantially complete enclosure for the blade.

FIG. 7 illustrates another experiment that was made in an effort to reduce noise output. An air nozzle 52 was installed in the interior of the upper guard member, near the end of the arcuate wall portion 27 at which the blade teeth enter the guard enclosure. The nozzle 52 was connected with a source of pressurized air and was arranged to direct a stream of air along the inner surface of the arcuate wall portion 27 in the direction of blade rotation. The objective here was to reduce the relative velocity between the blade teeth and the surrounding air, with a view to eliminating or reducing the shedding of vortices from the peripheral portions of the blade. From tests and calculations it was concluded that a noise reduction on the order of 2dB maximum can be achieved with this expedient, provided the distance between the side walls of the upper guard member is made as small as possible in order to reduce the size of the effective duct in which the accelerated air flow is produced. It was found that in order to produce a sufficient air velocity for the air around the teeth to be moving at a speed substantially close to that of the teeth, an air mass flow rate would have to be used that was so high as to involve jet flow noise from the nozzle or nozzles through which air was fed into the interior of the guard. Jet noise increases with air mass flow rate, and the jet noise tends to be radiated at frequencies above 2,000 $H_z$. Apparently control of air flow around the blade can be useful in cases where marginal improvement is needed, provided careful attention is given to the means by which such flow control is effected.

In general, careful tests have shown that a practical saw guard embodying the principles of the present invention can effect a reduction in noise level of a radial arm sawing machine that is in excess of 10dB and can be as high as 14.5 dB. This degree of silencing is very significant because it can bring every major sawing operation into compliance with currently effective noise regulations.

From the foregoing description taken with the accompanying drawings it will be apparent that this invention provides a combined guard and silencer for rotary cutting tools, and particularly for machines having circular saw blades, whereby the machine operator is effectively protected from contact with the cutting tool without being inconvenienced in the use of the machine and whereby a very substantial and significant reduction in the noise output of the machine is achieved.

Those skilled in the art will appreciate that the invention can be embodied in forms other than as herein disclosed for purposes of illustration.

The invention is defined by the following claims.

We claim:

1. A combined guard and silencer for use in combination with a rotary cutting tool having radially projecting cutting teeth spaced around its periphery, said combined guard and silencer being characterized by:
    A. a pair of substantially imperforate side wall means, one for each of the axially opposite sides of the cutting tool, each of said side wall means having a shape and an area to overlie substantially all of the axially facing area of the cutting tool;
    B. rigid means bridgingly connecting said side wall means to hold them in flatwise opposing relation to one another at axially opposite sides of the cutting tool, said rigid means being substantially imperforate and extending around a major portion of the periphery of the cutting tool to prevent escape of noise from between the side wall means; and
    C. sound absorbing means on the opposing inner surfaces of said side wall means, in at least a substantially major portion of the area thereof that extends radially inwardly from a zone near the gullets of the cutting teeth.

2. The combined guard and silencer of claim 1, further characterized by:
    D. each of said side wall means comprising a pair of side wall elements, one of which is relatively fixed and the other of which is relatively movable in opposite directions transverse to the cutting tool axis to enable a peripheral portion of the cutting tool to be exposed for cutting but otherwise to substantially cover said peripheral portion.

3. The combined guard and silencer of claim 1, further characterized by:
    said sound absorbing means comprising a layer of acoustic foam material overlying the inner surface of said side wall means.

4. The combined guard and silencer of claim 1, further characterized by:
    said sound absorbing means comprising numerous closely adjacent resonator cavities formed in said side wall means and opening to the inner side thereof, each of said cavities being resonant at one of a plurality of different frequencies, and adjacent cavities being to a substantial extent resonant at substantially different frequencies.

5. The combined guard and silencer of claim 4, wherein a majority of said cavities are resonant at frequencies in the range of 2,000 to 3,000 Hz.

6. The combined guard and silencer means of claim 1, wherein one of said side wall means is axially nearer to the cutting tool than the other.

7. The combined guard and silencer means of claim 1, wherein said side wall means comprise a material which is substantially rigid but tends to damp vibration.

8. The combined guard and silencer of claim 1, wherein said rigid means connecting said side wall means is substantially imperforate and extends entirely across the distance between said side wall means and in an arc substantially concentrically with the cutting tool around a substantial portion of the cutting tool periphery, further characterized by:
 means for injecting a stream of air into the interior of said guard tangentially to said rigid means, in the direction of rotation of the cutting tool, to provide a low relative speed between the teeth of the cutting tool and the air in which they move through the interior of the guard.

9. In combination with a disc-like rotary cutting tool that has circumferentially spaced cutting teeth on its periphery that are engageable in one zone of their orbit with workpieces to be cut, means providing both a guard and a silencer for the cutting tool, said means comprising:
 A. substantially imperforate means defining a relatively stationary enclosure for the part of the tool which is not in said zone, said substantially imperforate means comprising
  (1) a pair of fixed side wall members that respectively oppose axially opposite faces of the cutting tool, and
  (2) an axially extending wall portion that bridgingly connects said side wall members and extends around a substantial portion of the periphery of the tool;
 B. a pair of imperforate movable side wall members, one at each axial side of the tool, said movable side wall members being mounted in flatwise opposing relation to one another and to the tool and being edgewise movable to and from non-cutting positions in which they cooperate with the fixed side wall members to cover the entire area of each of said faces of the tool, movement of said movable side wall members out of their non-cutting positions providing for exposure of the portion of the tool in said zone; and
 C. sound absorbing means on each of said side wall members, covering a substantially major portion of the surface thereof that faces the cutting tool.

10. The combination of claim 9, further characterized by:
 said sound absorbing means comprising a substantially large plurality of resonant cavities in each side wall member, opening towards the axially adjacent face of the cutting tool, each of said cavities being resonant at one of a plurality of different frequencies, and adjacent ones of said cavities being resonant at substantially different frequencies.

11. The combination of claim 10, further characterized by:
 said resonant cavities being located substantially only on portions of the side wall members that are axially opposite those portions of the cutting tool which normally lie radially inward of the gullets of its cutting teeth.

12. The combination of claim 9, further characterized by:
 said cutting tool being closer to one of said fixed side wall members than to the other one.

13. The combination of claim 9, wherein said sound absorbing means comprises acoustic foam overlying axially inner surfaces of said side wall members.

14. The combination of claim 9, wherein said axially extending wall portion is arcuate and substantially concentric to the cutting tool, further characterized by:
 nozzle means communicable with a source of air under pressure and opening to the interior of said relatively stationary enclosure, said nozzle means being arranged to produce air movement circumferentially around the interior of said arcuate wall portion in the direction of cutting tool rotation.

15. The combination of claim 9, wherein each of said side wall members is made of a vibration damping material.

16. A guard for a rotary cutting tool that has circumferentially spaced cutting teeth on its periphery, said guard providing for substantial silencing of the cutting tool and being characterized by:
 A. said guard having side wall portions normally overlying substantially all portions of the area of each axial face of the cutting tool;
 B. said guard having an imperforate wall portion connecting said side wall portions and extending circumferentially around a major portion of the periphery of the cutting tool;
 C. said guard being substantially imperforate; and
 D. the inner surfaces of said side wall portions of said guard having sound absorbing means over substantially major portions of their areas.

17. Silencing means for reducing the noise output of a disc-like rotary cutting tool having circumferentially spaced cutting teeth around its periphery, said means comprising:
 A. a substantially imperforate guard normally enclosing a substantial portion of the cutting tool and having
  (1) side wall portions which oppose axially opposite surfaces of the cutting tool and
  (2) an arcuate wall portion that extends around a substantial part of the periphery of the cutting tool in substantially concentric relation thereto; and
 B. nozzle means communicable with a source of air under pressure and opening to the interior of said guard, said nozzle means being arranged to produce a flow of air along the interior of said arcuate wall portion in the direction of rotation of the cutting tool and at a substantially high velocity.

18. The silencing means of claim 17, further characterized by:
 C. sound absorbing means on a major part of the area of the inner surface of each of said side wall portions.

19. A guard for a rotary cutting tool having circumferentially spaced cutting teeth on its periphery that are engageable in one zone of their orbit with workpieces to be cut, said guard providing for substantial silencing of the cutting tool and being characterized by:
 A. said guard having fixed and movable wall portions that cooperate to normally enclose substantially all portions of the cutting tool, but to provide for exposure of the portion of the cutting tool which is in said zone, to enable a workpiece to be cut, said fixed wall portions comprising side wall portions overlying substantial portions of the area of each axial face of the cutting tool and axially extending wall portions that connect said side wall portions and extend around a major portion of the periphery of the cutting tool;

B. said wall portions of the guard being substantially imperforate; and

C. at least said side wall portions of the guard having sound absorbing means over substantially major portions of their areas.

* * * * *